US009219758B2

(12) United States Patent
Suryavanshi et al.

(10) Patent No.: US 9,219,758 B2
(45) Date of Patent: Dec. 22, 2015

(54) RENEWING REGISTRATIONS FOR A PLURALITY OF CLIENT APPLICATIONS THAT ARE ASSOCIATED WITH THE SAME HOST SERVER VIA AN IMPLICIT PIGGYBACKING SCHEME

(71) Applicant: QUALCOMM Incorporated, San Diego, CA (US)

(72) Inventors: Vijay A. Suryavanshi, San Diego, CA (US); Mohammed Ataur Rahman Shuman, San Diego, CA (US); Mark A. Maggenti, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 339 days.

(21) Appl. No.: 13/786,292

(22) Filed: Mar. 5, 2013

(65) Prior Publication Data

US 2014/0258367 A1    Sep. 11, 2014

(51) Int. Cl.
*G06F 15/16*    (2006.01)
*H04L 29/06*    (2006.01)
*H04W 4/00*    (2009.01)
*H04L 29/08*    (2006.01)

(52) U.S. Cl.
CPC ........ *H04L 65/1006* (2013.01); *H04L 65/1073* (2013.01); *H04W 4/001* (2013.01); *H04L 67/02* (2013.01); *H04L 67/04* (2013.01)

(58) Field of Classification Search
CPC ............ H04L 65/1006; H04L 65/1073; H04L 67/142; H04L 67/42; H04W 4/001
See application file for complete search history.

(56) References Cited

U.S. PATENT DOCUMENTS

| 7,127,485 | B2  |    | 10/2006 | Caruso et al.         |
|-----------|-----|----|---------|-----------------------|
| 7,480,254 | B2  | *  | 1/2009  | Mayer ........... 370/254 |
| 8,479,268 | B2  | *  | 7/2013  | Bade et al. ........ 726/4 |
| 2004/0243680 | A1 |   | 12/2004 | Mayer                 |
| 2007/0083620 | A1 | * | 4/2007  | Pedersen ........ 709/219 |
| 2008/0089290 | A1 | * | 4/2008  | Coulas et al. ...... 370/331 |
| 2008/0172486 | A1 |   | 7/2008  | Danne et al.          |
| 2009/0029726 | A1 | * | 1/2009  | Danne et al. ........ 455/466 |
| 2011/0145891 | A1 |   | 6/2011  | Bade et al.           |

OTHER PUBLICATIONS

International Search Report and Written Opinion—PCT/US2014/020384—ISA/EPO—Jul. 8, 2014.

* cited by examiner

*Primary Examiner* — Yves Dalencourt
*Assistant Examiner* — Thorne E Waugh
(74) *Attorney, Agent, or Firm* — Muncy, Geissler, Olds & Lowe, P.C.

(57) ABSTRACT

In an embodiment, a server registers each of the plurality of client applications on the same client device. The server receives a given registration request message from the client device that includes a request for renewing a registration for a first of the plurality of client applications with the server, and the server renews the first client application's registration in response to the given registration request message. The server also determines, in response to the given registration request message, whether to preemptively renew registrations for one or more other client applications from the plurality of client applications. The server selectively renews the registrations for the one or more other client applications based on the determination.

15 Claims, 9 Drawing Sheets

RENEWING REGISTRATIONS FOR A PLURALITY OF CLIENT APPLICATIONS THAT ARE ASSOCIATED WITH THE SAME HOST SERVER VIA AN IMPLICIT PIGGYBACKING SCHEME

BACKGROUND OF THE INVENTION

1. Field of the Invention

Embodiments of the invention relate to renewing registrations for a plurality of client applications that are associated with the same host server via an implicit piggybacking scheme.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., mobile devices such as cell phones) that use the above-noted communication systems or other types of access networks (e.g., WiFi, etc.) to maintain registrations for client applications with one or more host servers. For example, a user may be logged into his/her Facebook account with a Facebook host server via a Facebook client application on his/her cellular phone, a user may be logged onto his/her email account with an email host server via an email client application on his/her cellular phone, etc. These client application registrations are typically temporary and require periodic renewals or else the client applications' will be deregistered by their respective host servers. It is also possible that two or more client applications maintain active registrations with the same host server. In this case, the two or more client applications will typically be required to transmit independent registration renewal requests for extending or renewing the registrations of the respective client applications.

SUMMARY

In an embodiment, a server registers each of the plurality of client applications on the same client device. The server receives a given registration request message from the client device that includes a request for renewing a registration for a first of the plurality of client applications with the server, and the server renews the first client application's registration in response to the given registration request message. The server also determines, in response to the given registration request message, whether to preemptively renew registrations for one or more other client applications from the plurality of client applications. The server selectively renews the registrations for the one or more other client applications based on the determination.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
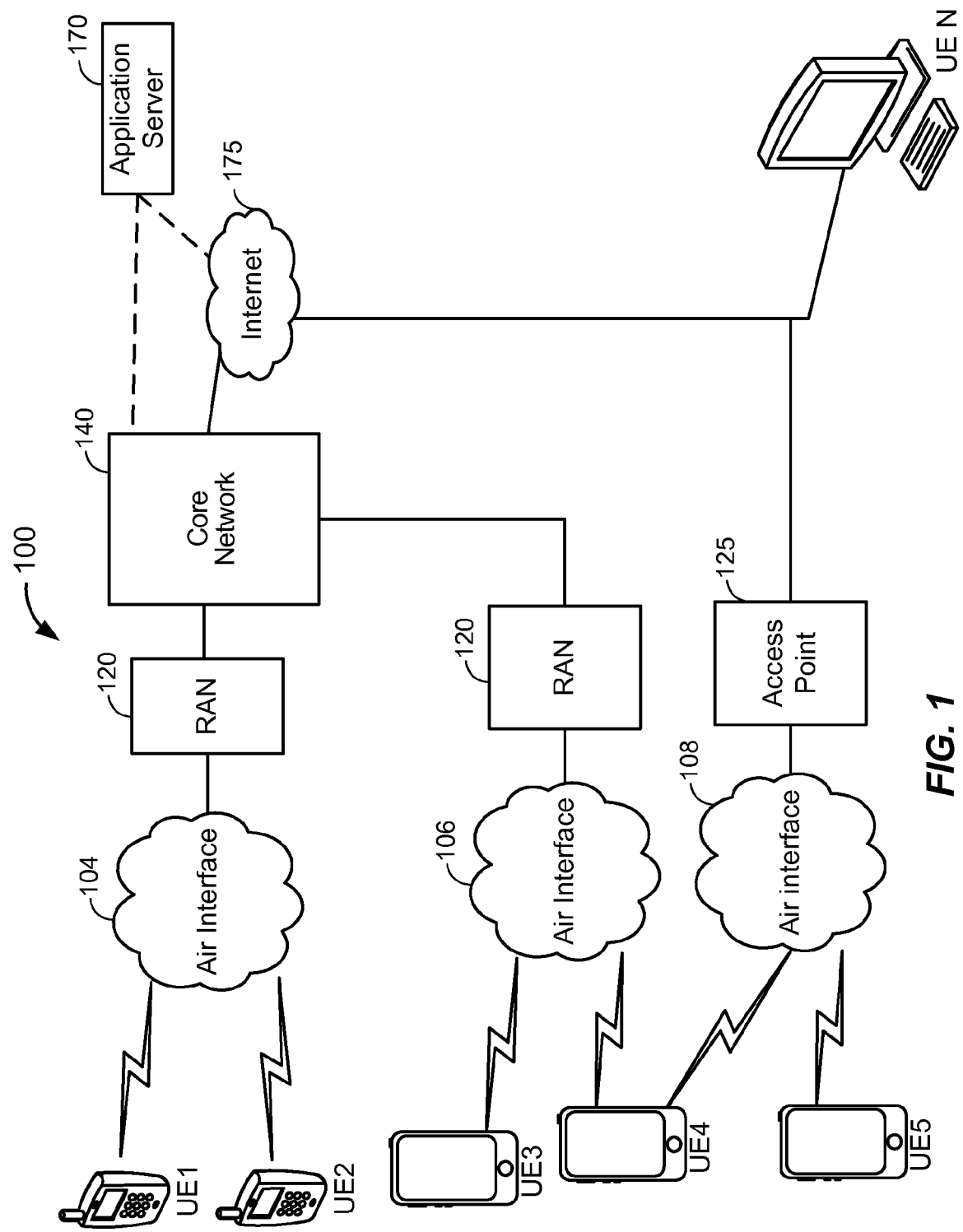
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175, and/or to provide content (e.g., web page downloads) to the UEs.

Figure 2:
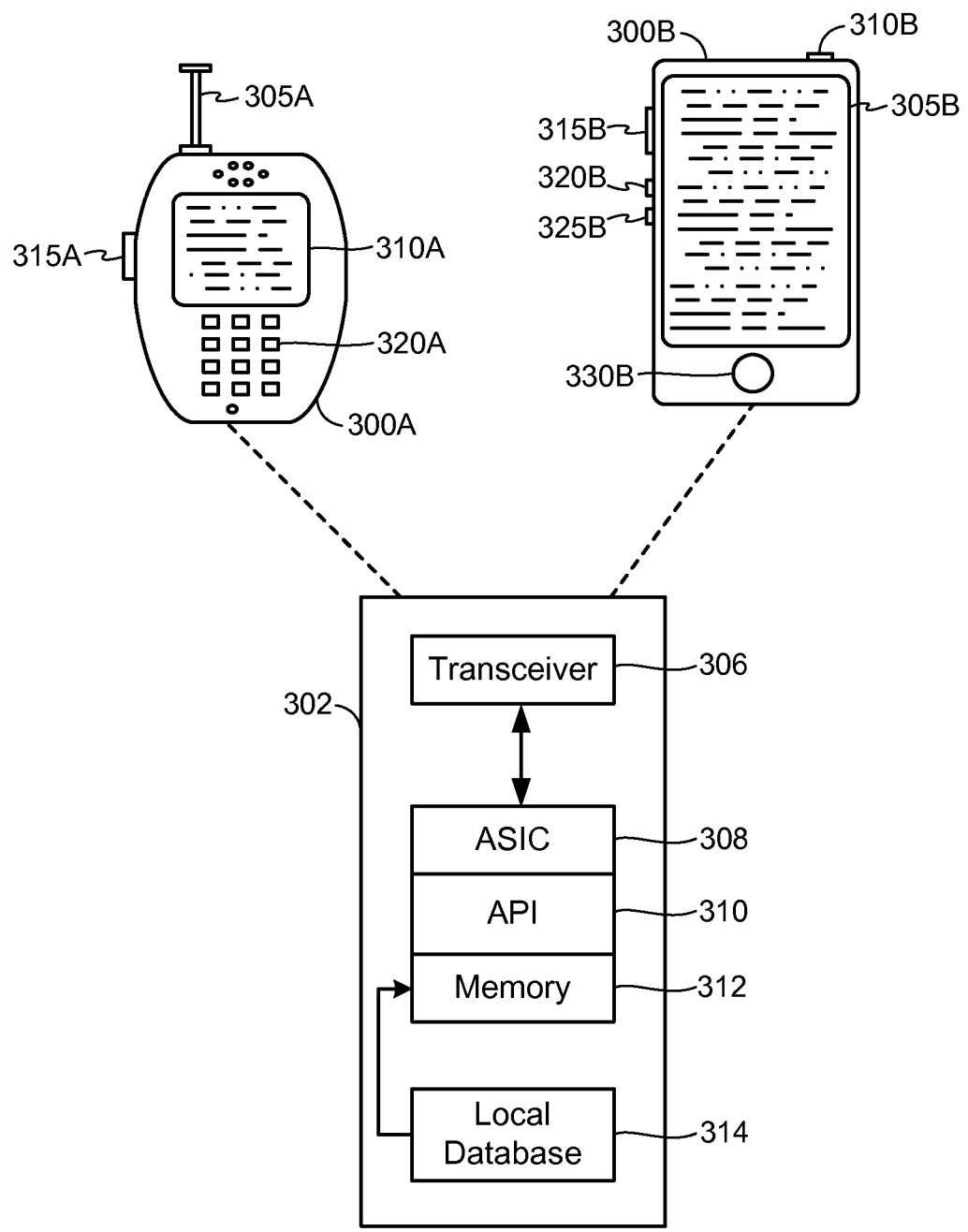
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 300A is illustrated as a calling telephone and UE 300B is illustrated as a touchscreen device (e.g., a smart phone, a tablet computer, etc.). As shown in FIG. 2, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 2. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 2 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
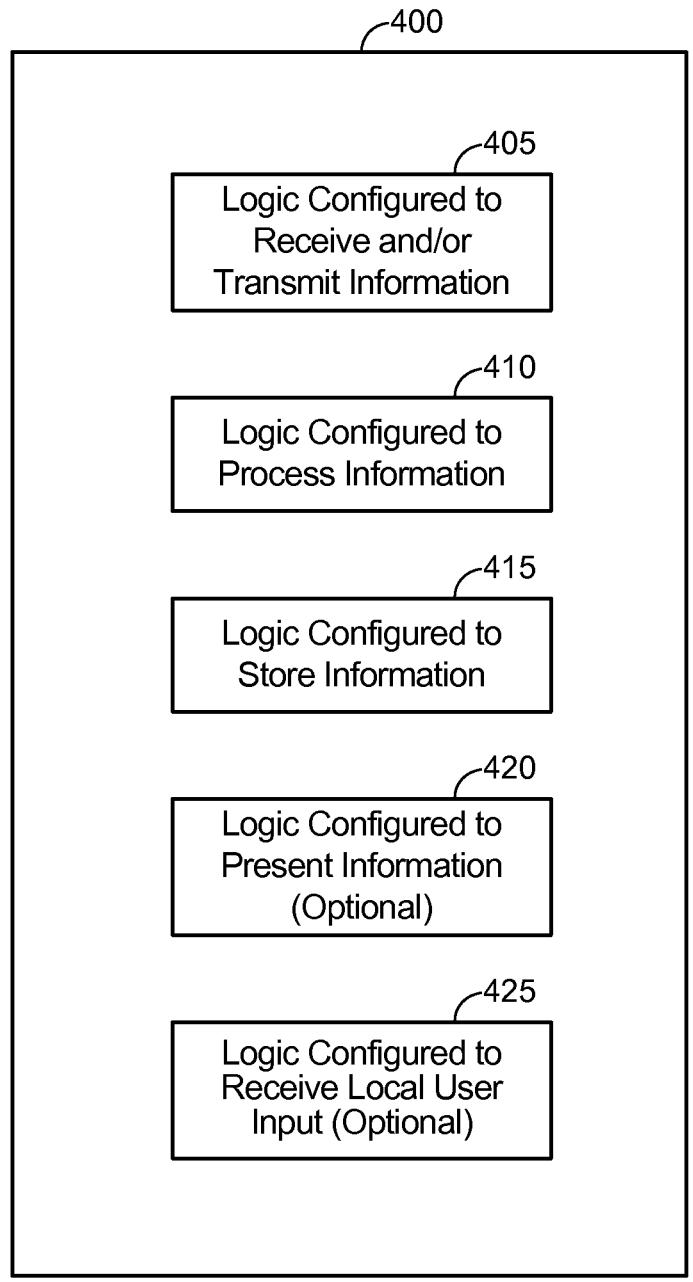
FIG. 3 illustrates a communication device that includes logic configured to perform functionality in accordance with an embodiment of the invention.

FIG. 3 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 3, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 3, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 3, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 3, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 2, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the application server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 3, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 2, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the application server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 3, while the configured logics of 405 through 425 are shown as separate or distinct blocks in FIG. 3, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

It is typical for client devices to maintain registrations for client applications with one or more host servers. For example, a user may be logged into his/her Facebook account with a Facebook host server via a Facebook client application on his/her UE, a user may be logged onto his/her email account with an email host server via an email client application on his/her UE, etc. These client application registrations are typically temporary and require periodic renewals or else the client applications' will be deregistered by their respective host servers. It is also possible that two or more client applications running on the same device maintain active registrations with the same host server. In this case, the two or more client applications will typically be required to transmit independent registration renewal requests from the same device for extending or renewing the registrations of the respective client applications.

Figure 4:
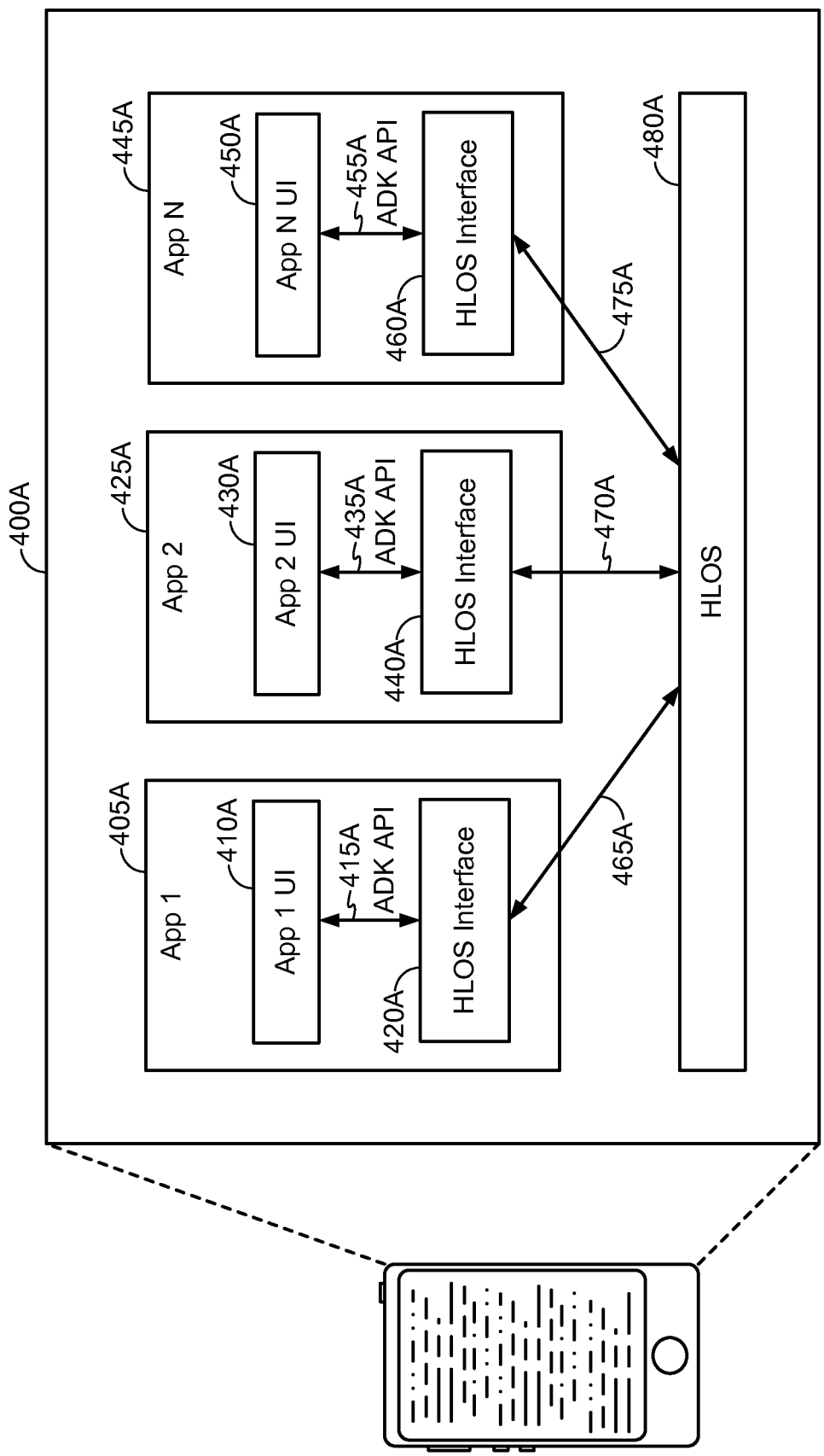
FIG. 4 illustrates an example of client architecture that can be implemented on a client device in accordance with an embodiment of the invention.

FIG. 4 illustrates an example of client architecture that can be implemented on a client device 400A (e.g., such as UE 300A or 300B of FIG. 2) in accordance with an embodiment of the invention. The client architecture may be representative of an Android operating system (OS) device, an iOS device, a Windows OS device or a device executing some other OS. Referring to FIG. 4, the client architecture of the client device 400A includes a first client application ("App1") 405A which includes an App1 user interface (UI) 410A, a logical interface 415A (e.g., an Accessory Development Kit (ADK) API) that connects the App1 UI 410A to a high-level operating system (HLOS) interface module 420A (e.g., an ADK module or ADK (YPC)). The client architecture of the client device 400A further includes a second client application ("App2") 425A which includes an App2 UI 430A, a logical interface 435A (e.g., an ADK API) that connects the App2 UI 430A to an HLOS interface module 440A (e.g., an ADK module or ADK (YPC)). The client architecture of the client device 400A further includes at least one additional client application ("AppN") 445A which each include an AppN UI 450A, a logical interface 455A (e.g., an ADK API) that connects the AppN UI 450A to an HLOS interface module 460A (e.g., an ADK module or ADK (YPC)). The HLOS interface modules 420A, 440A and 460A for Apps 1 . . . N are each connected to an HLOS 480A via HLOS interfaces 465A, 470A and 475A, respectively, which in turn connects the respective Apps 1 . . . N to other components of the client device 400A.

Figure 5:
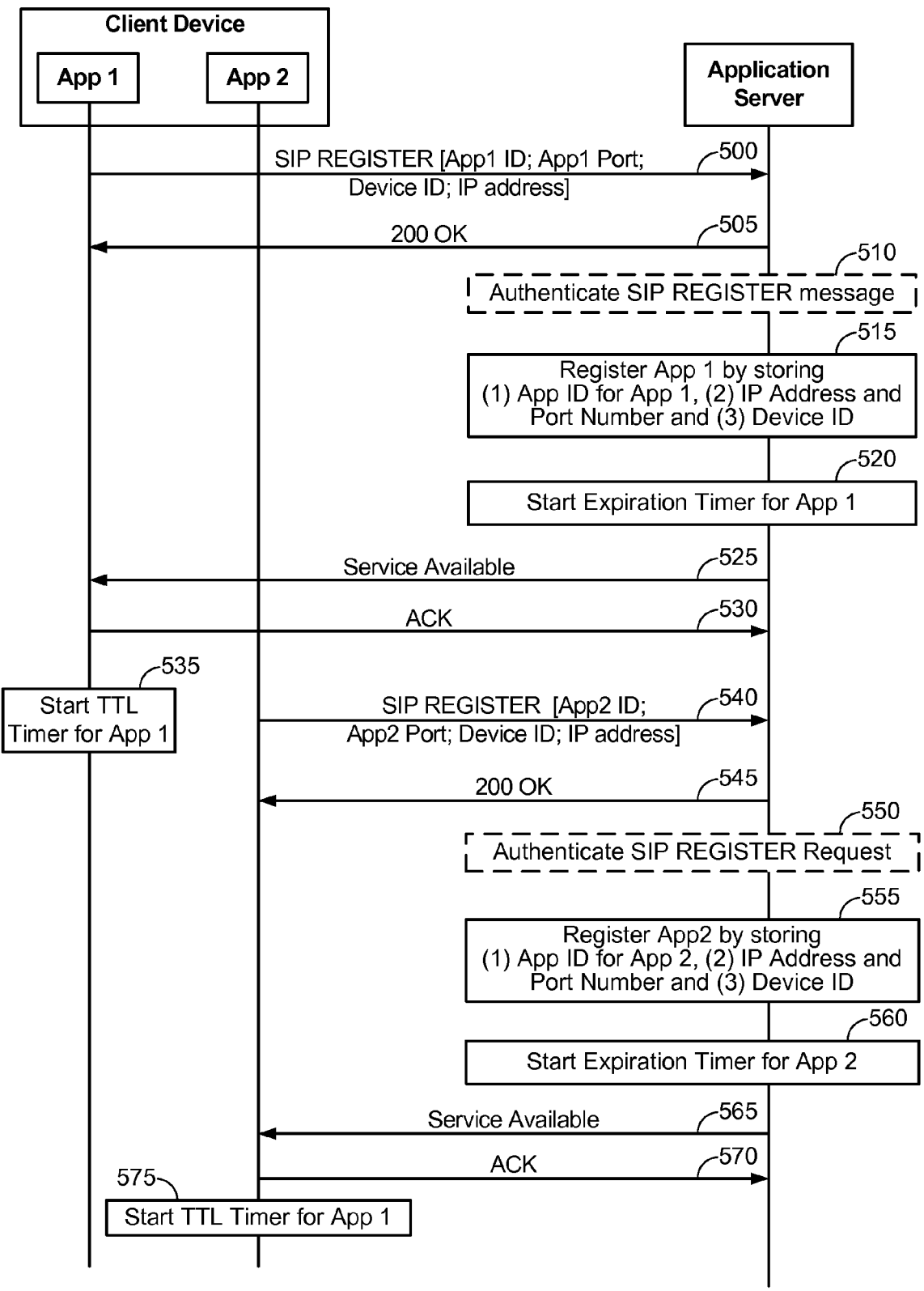
FIG. 5 illustrates an example registration procedure that can be implemented for App1 and App2 as shown in FIG. 4.

FIG. 5 illustrates an example registration procedure that can be implemented for App1 and App2 as shown in FIG. 4. In FIG. 5, it is assumed that App1 and App2 are each configured to be supported by and registered with the same host server ("application server 170"). This assumption is not necessarily true for each of Apps 1 . . . N (e.g., App3 may be supported by a different host server, App4 may not be supported by any host server, etc.). For example, App1 and App2 can be two distinct VoIP applications on the client device 400A that obtain service through a VoIP server, two distinct Facebook-related client applications on the client device 400A that obtain service through a Facebook server (e.g., a photoviewing app and a status update app), etc.

Referring to FIG. 5, App1 transmits a registration message to the application server 170, 500. In FIG. 5, the registration message of 500 is shown as implemented via a Session Initiation Protocol (SIP) REGISTER message that includes an App1 identifier (ID), an IP address and port number used by App1 on the client device 400A, a device identifier (ID) of the client device 400A. In an example, the port number used by App1 may be unique to App1, while the IP address used by App1 can also be shared with other client applications so that the client applications can be distinguished by their port number. The application server can thereby use the IP address in conjunction with App1's port number to route messages from external devices to App1 on the client device 400A. Also, the App1 ID may be implemented as a globally unique ID that distinguishes App1 from other client applications. Thus, any other client device with App1 can use the same App1 ID for App1. Also, the device ID can correspond to a globally unique identifier for the client device 400A that distinguishes client device 400A from any other client device, such as a MAC address. For convenience of explanation, the registration messages described throughout this application will refer to SIP REGISTER messages in accordance with SIP, but it will be appreciated that other embodiments can be directed to non-SIP implementations.

Referring to FIG. 5, at 505, the application server 170 acknowledges (ACKs) the SIP REGISTER message from 500 by sending a 200 OK message to App1 on the client device 400A based on the IP address of the client device 400A and App1's port number from the SIP REGISTER message of 500. Also, in response to the SIP REGISTER message from 500, the application server 170 optionally authenticates App1's SIP REGISTER message, 510. If the SIP REGISTER message from 500 is properly authenticated at 510 (or if authentication is skipped), the application server 170 registers App1 by establishing a record for App1 that includes (i) App1's ID, (ii) the IP address and port number associated with App1, and (iii) the device ID associated with the client device 400A, 515. The application server 170 also starts an expiration timer for the registration of App1, 520, whereby the application server 170 is configured to de-register App1 upon expiration of App1's expiration timer.

The application server 170 sends a message to App1 on the client device 400A that indicates service is available for App1, 525, and App1 sends an ACK in response to the service available message, 530. At 535, App1 starts a time to live (TTL) timer that is configured to expire before the expiration timer for App1 that is running at the application server 170. Expiration of App1's TTL timer will trigger App1 to transmit another SIP REGISTER message for renewing or extending App1's registration with the application server 170 by resetting App1's expiration timer.

At some later point in time, App2 transmits a SIP REGISTER message 540 to the application server which includes an App2 ID, the IP address and port number used by App2 on the client device 400A and the device ID of the client device 400A. As noted above, the IP address for App2 can be the same IP address used by App1, while the respective port numbers for App1 and App2 are different.

Referring to FIG. 5, at 545, the application server 170 ACKs the SIP REGISTER message from 540 by sending a 200 OK message to App2 on the client device 400A based on the IP address of the client device 400A and App2's port number from the SIP REGISTER message of 540. Also in response to the SIP REGISTER message from 540, the application server 170 optionally authenticates App2's SIP REGISTER message, 550. If the SIP REGISTER message from 540 is properly authenticated at 550 (or if authentication is skipped), the application server 170 registers App2 by establishing a record for App2 that includes (i) App2's ID, (ii) the IP address and port number associated with App2, and (iii) the device ID associated with the client device 400A, 555. The application server 170 also starts an expiration timer for the registration of App2, 560, whereby the application server 170 is configured to de-register App2 upon expiration of App2's expiration timer.

The application server 170 sends a message to App2 on the client device 400A that indicates service is available for App2, 565, and App2 sends an ACK in response to the service available message, 570. At 575, App2 starts a TTL timer that is configured to expire before the expiration timer for App2 that is running at the application server 170. Expiration of App2's TTL timer will trigger App2 to transmit another SIP REGISTER message for renewing or extending App2's registration with the application server 170 by resetting App2's expiration timer.

Figure 6:
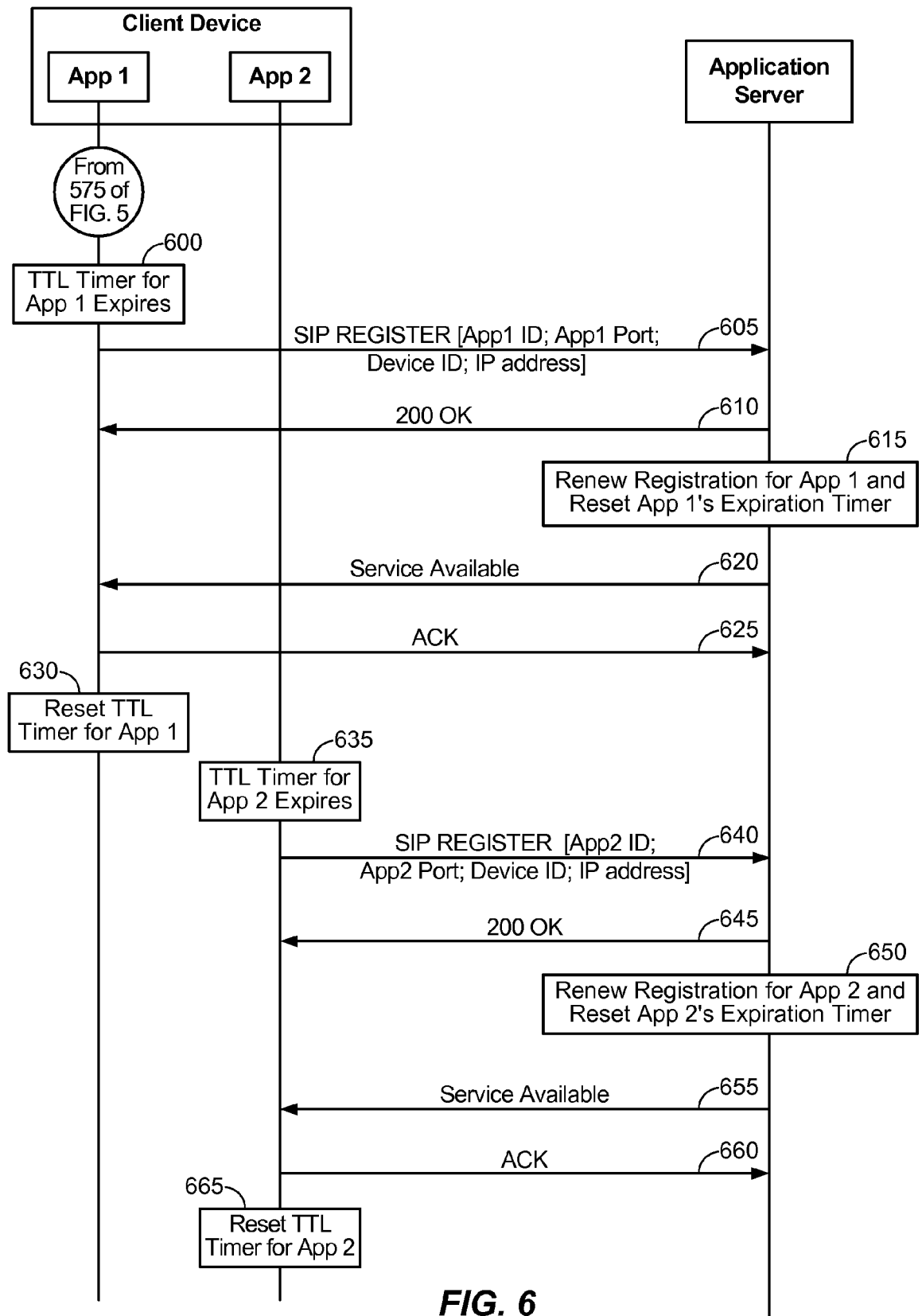
FIG. 6 illustrates a conventional mechanism for renewing or extending the registrations for App1 and App2 after execution of the process of FIG. 5.

FIG. 6 illustrates a conventional mechanism for renewing or extending the registrations for App1 and App2 after execution of the process of FIG. 5. Referring to FIG. 6, at some point after the client device 400A starts App2's TTL timer at 575, the client device 400A determines that App1's TTL timer has expired, 600. This triggers App1 to transmit another SIP REGISTER message at 605 that functions to request the application server 170 to extend or renew App1's registration with the application server 170. The application server 170 ACKs the SIP REGISTER message from 605 with a 200 OK message, 610, and the application server 170 also renews the registration for App1 by resetting or extending App1's expiration timer, 615. As will be appreciated, the operation of 615 pushes back the point in time at which App1's registration would otherwise expire. The application server 170 notifies App1 that its registration has been renewed by sending a service available message, 620, and App1 ACKs the service available message, 625. App1 resets or restarts the App1 TTL timer at 630, such that App1 will send another SIP REGISTER message for renewing App1's registration with the application server 170 the next time the App1 TTL timer expires, and so on.

Referring to FIG. 6, the client device 400A determines that App2's TTL timer has expired, 635. This triggers App2 to transmit another SIP REGISTER message at 640 that functions to request the application server 170 to extend or renew App2's registration with the application server 170. The application server 170 ACKs the SIP REGISTER message from 640 with a 200 OK message, 645, and the application server 170 also renews the registration for App2 by resetting or extending App2's expiration timer, 650. As will be appreciated, the operation of 650 pushes back the point in time at which App2's registration would otherwise expire. The application server 170 notifies App2 that its registration has been renewed by sending a service available message, 655, and App2 ACKs the service available message, 660. App2 resets or restarts the App2 TTL timer at 665, such that App2 will send another SIP REGISTER message for renewing App2's registration with the application server 170 the next time the App2 TTL timer expires, and so on.

While different client applications usually register themselves with different host servers (e.g., a Facebook client application registers with a Facebook server, an email client application registers with an email server, etc.), it is becoming more common for different client applications to maintain separate registrations with the same host server, as shown in FIGS. 5-6. However, the conventional approach shown in FIG. 6 whereby each client application independently engages in its own registration renewal procedure can be wasteful in terms of resource usage when multiple client applications maintain their registrations with the same host server (e.g., the client device is required to acquire a traffic channel and transmit a registration renewal request each time any of its TTL timers expire for any of its client applications, even if two or more of the client applications expire in close proximity). Accordingly, embodiments of the invention relate to reducing the amount of messaging used to renew registrations for multiple client applications that are registered with the same host server by consolidating or aggregating registration renewal requests for different client applications into a single transmission.

Figure 7:
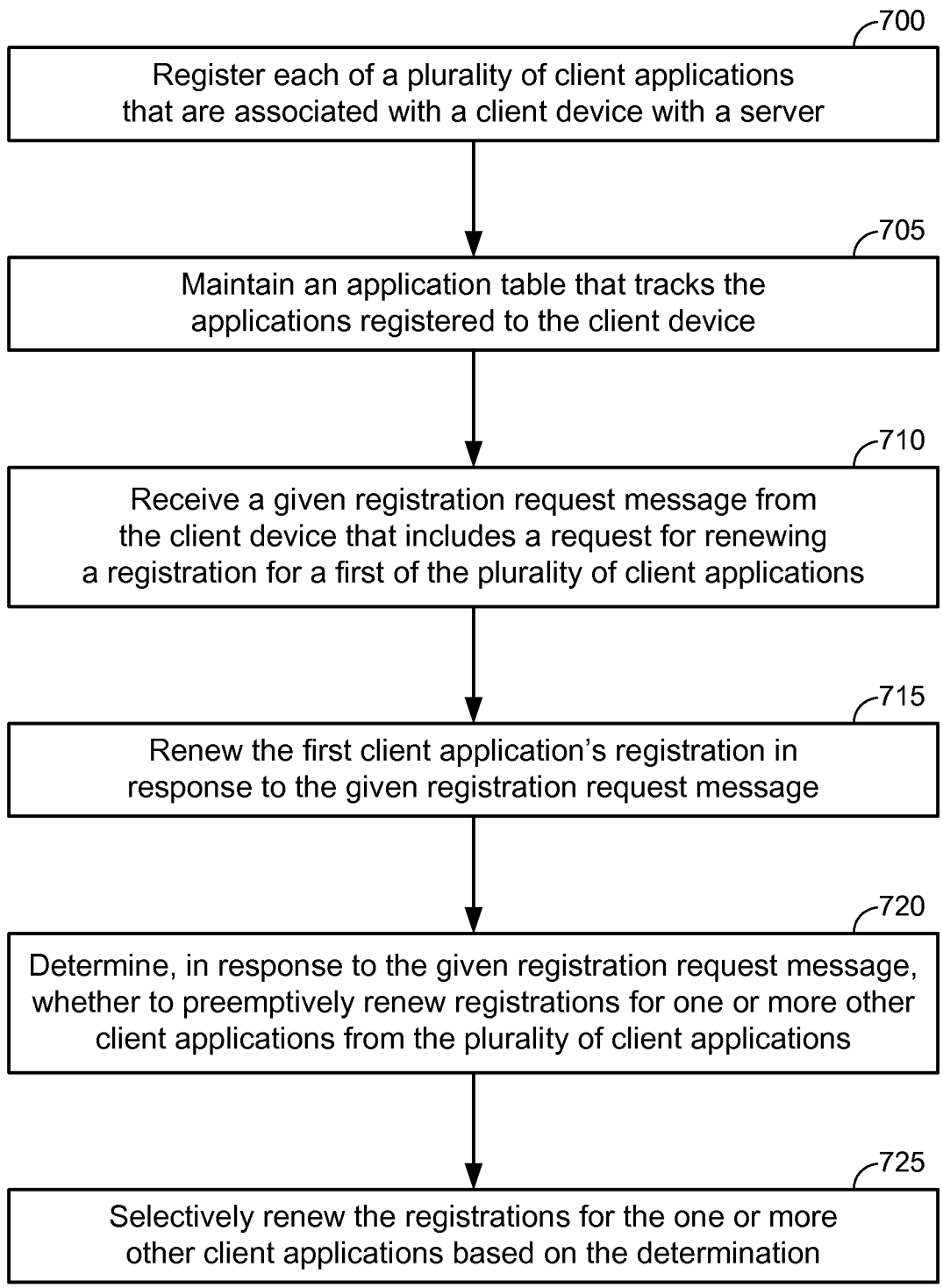
FIG. 7 illustrates operation of an application server in accordance with an embodiment of the invention.

FIG. 7 illustrates operation of the application server 170 in accordance with an embodiment of the invention. Referring to FIG. 7, the application server 170 registers App1 and App2, 700 (e.g., as in 510-520 and 550-560 of FIG. 5). As each client application is registered, the application server 170 establishes or updates an application table that tracks the client applications associated with the client device 400A that have active or current registrations with the application server 170, 705. For example, if App1 and App2 are registered to the client device with a device ID of "John's Phone", the application table for the client device 400A may be configured as follows:

TABLE 1

Application Table Example

| Device ID | Associated Client Applications |
|---|---|
| John's Phone | App1: [App1 port number and IP address, App1 ID]<br>App2: [App2 port number and IP address, App2 ID] |

As will be appreciated, Table 1 can also include client applications associated with other client devices, and Table 1 can include additional client applications and/or can be updated to remove App1 or App2 as Table 1 is kept up-to-date with current application registrations on a device-by-device basis.

Referring to FIG. 7, the application server 170 receives a given registration request message from App1 that includes a request for renewing App1's registration with the application server 170, 710. In response to the given registration request message, the application server 170 extends or renews registrations for App1, 715 (e.g., by resetting its registration expiration timer).

The given registration request message from App1 that is received by the application server 170 at 710 does not explicitly include a separate request for renewing App2's registration with the application server 170. However, the application server 170 on its own initiative determines whether to preemptively renew registrations for one or more other client applications that are registered to the same client device as App1, 720. As an example, the application server 170 can use the application table (e.g., see Table 1 above) to identify any client applications other than App1 that are also registered to the same device (e.g., John's Phone), and if any such client applications are detected, the application server 170 determines to preemptively renew the detected client application(s). As a further example, the application server 170 can use the application table (e.g., see Table 1 above) to identify any client applications other than App1 that are registered to the same device (e.g., John's Phone) as App1 and are also due to expire within a threshold period of time (e.g., based on their respective expiration timers), and if any such client applications are detected, the application server 170 determines to preemptively renew the detected client application(s). Accordingly, each incoming registration renewal request can trigger automatic renewals for all other client applications registered to the same device, or each incoming registration renewal request can instead more selectively trigger automatic renewals for each other client application that is registered to the same device and is also nearing expiration.

In yet another example, an activity level of the client applications can affect whether the client applications are selected for preemptive renewal. For example, if the given registration request message is received for App1 and App2 is registered to the same client device but App2 has not interacted with the server in more than a threshold period of time (e.g., a day, a week, etc.), App2's inactivity may cause the application server 170 to refrain from preemptively renewing its registration in response to App1's registration renewal request. On the other hand, if App2 is being used by the client device 400A frequently and/or recently, App2's high activity level may cause the application server 170 to preemptively renew its registration in response to App1's registration renewal request.

In yet another example, instead of automatically attempting to preemptively renew each other client application associated with the same client device from which a registration renewal request is received, a subset of these client applications may be considered for preemptive renewal. For example, assume that App2 is configured to permit preemptive registration renewals and that App3 is not configured to permit registration renewals (e.g., based on a user preference, an application developer preference, a carrier or network preference, etc.). In this case, App1's registration renewal request will not trigger preemptive renewal for App3 irrespective of other preemptive renewal criteria (e.g., whether App3 is nearing its expiration or is used frequently, etc.).

As will be appreciated from the examples provided above, the preemptive renewal criteria that can be evaluated by the application server 170 at 720 includes, but is not limited to, (i) whether one or more other client applications currently have active registrations with the application server 170 in association with the same client device as the client device associated with the given registration request message from 710, (ii) whether the one or more other client applications are configured to permit preemptive registration renewals based on registration requests associated with a different client application on the client device, (iii) whether the one or more other client applications have interacted with the application server 170 within a first threshold period of time, and/or (iv) whether the active registrations for the one or more other client applications are scheduled to expire within a second threshold period of time.

Referring to FIG. 7, at 725, the application server 170 selectively renews the registrations for one or more client applications (other than App1) based on the determination from 720. For example, the application server 170 may determine to renew registrations for App2, for App2 and App3, for Apps 2 . . . N, etc., based on any of the registration renewal criteria discussed above with respect to 720.

Figure 8:
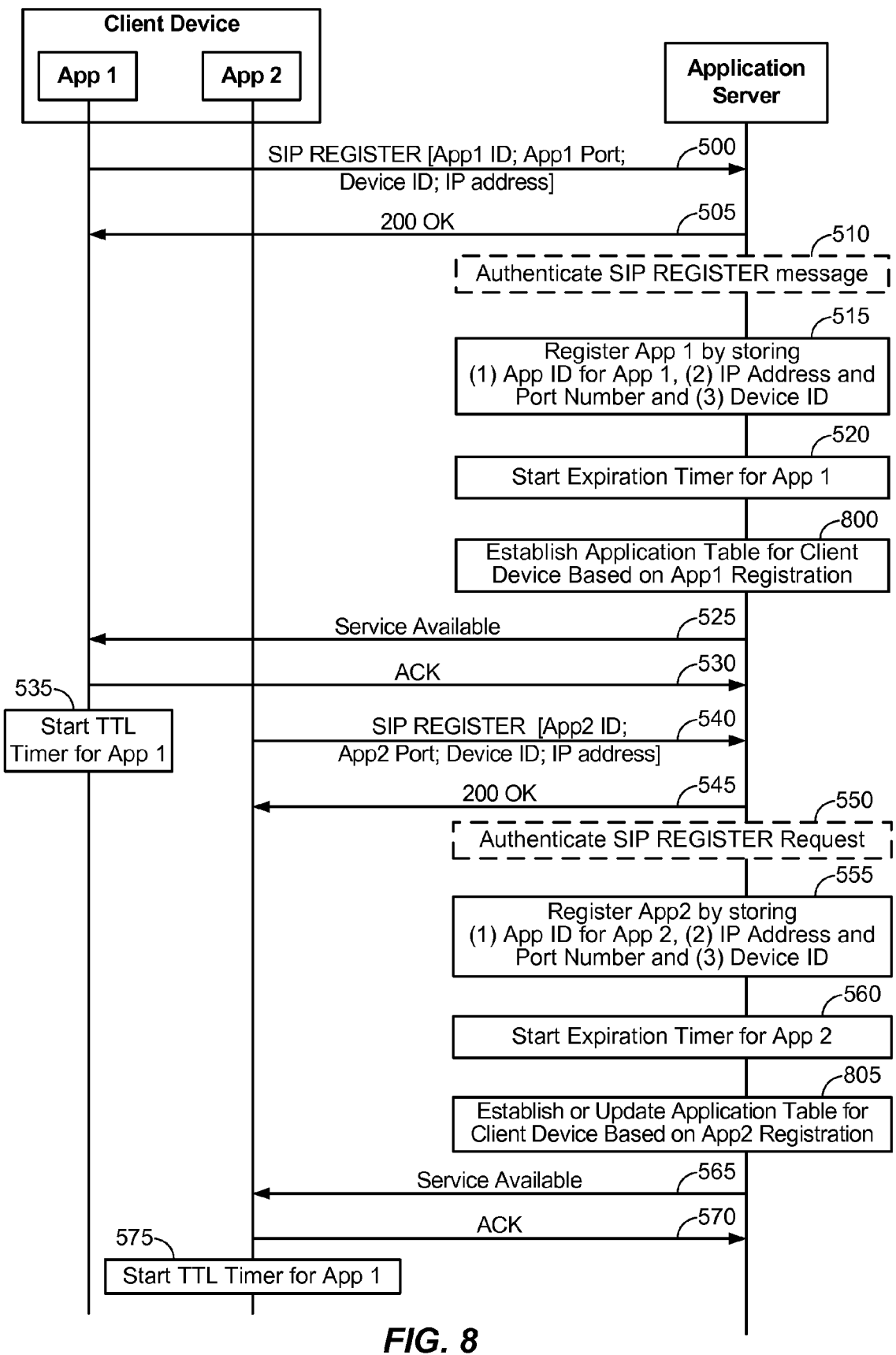
FIG. 8 illustrates a modified version of FIG. 5 in accordance with an embodiment of the invention.

FIG. 8 illustrates a modified version of FIG. 5 in accordance with an embodiment of the invention. In particular, FIG. 8 corresponds to an implementation of FIG. 5 that adopts the operation of 705 from FIG. 7 with respect to the application server 170 maintaining the application table for the client device 400A. Accordingly, any like-numbered elements between FIGS. 5 and 8 will be assumed to operate in the same manner.

Referring to FIG. 8, in conjunction with registering App1 at 515, the application server 170 establishes an application table for the client device 400A based on the App1 registration, 800. For example, under the assumption that App1 is the only actively registered client application associated with the client device 400A after 515, the application table may be established as shown in Table 2 (below) at 800:

TABLE 2

Application Table Example

| Device ID | Associated Client Applications |
|---|---|
| John's Phone | App1: [App1 port number and IP address, App1 ID] |

Still referring to FIG. 8, in conjunction with registering App2 at 555, the application server 170 updates the application table for the client device 400A based on the App2 registration, 805. At this point under the assumption that App1 and App2 are the only actively registered client application associated with the client device 400A after 555, the application table may be established as shown in Table 1 (above) at 805.

Figure 9:
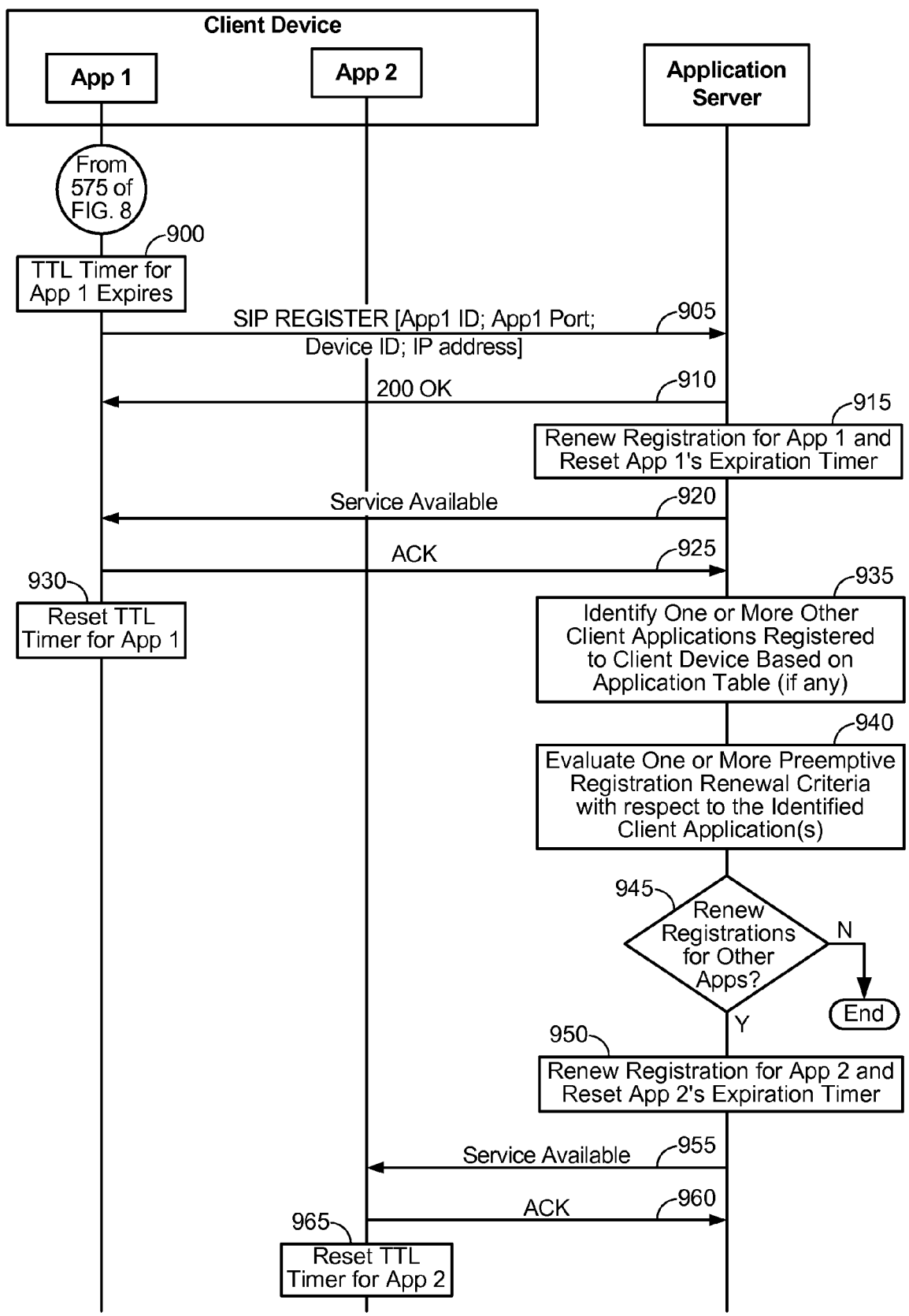
FIG. 9 illustrates a continuation of the process of FIG. 8 in accordance with an embodiment of the invention.

FIG. 9 illustrates a continuation of the process of FIG. 8 in accordance with an embodiment of the invention. Referring to FIG. 9, at some point after the client device 400A starts App2's TTL timer at 575, the client device 400A determines that App1's TTL timer has expired, 900. This expiration triggers App1 to transmit another SIP REGISTER message at 905 that functions to request the application server 170 to extend or renew App1's registration with the application server 170. The application server 170 ACKs the SIP REGISTER message from 905 with a 200 OK message, 910, and the application server 170 also renews the registration for App1 by resetting or extending App1's expiration timer, 915. The application server 170 notifies App1 that its registration has been renewed by sending a service available message, 920, and App1 ACKs the service available message, 925. App1 resets or restarts the App1 TTL timer at 930, such that App1 will send another SIP REGISTER message for renewing App1's registration with the application server 170 the next time the App1 TTL timer expires, and so on.

Referring to FIG. 9, in response to the SIP REGISTER message from 905, the application server 170 identifies one or more other client applications registered to the client device 400A based on the application table, 935. In 915 of FIG. 9, it is assumed that at least one other client application is registered to the client device 400A with the application server 170, although in an alternative scenario it is also possible that no other client applications are registered to the device 400A with the application server 170. At 940, the application server 170 evaluates one or more preemptive registration renewal criteria with respect to the identified client application(s) from 935. Based on the evaluation of 940, the application server 170 determines whether to preemptively renew registrations for any of the identified client application(s), 945. As will be appreciated, 935-945 correspond to an example implementation of the determination 720 from FIG. 7.

Referring to FIG. 9, if the application server 170 determines not to preemptively renew registrations for any other client applications, the process of FIG. 9 terminates. Otherwise, if the application server 170 determines to preemptively renew registrations for one or more other client applications, the process advances to 950. At 950, it is assumed that the application server 170 determines to preemptively renew App2's registrations. Accordingly, the application server 170 renews the registration for App2 by resetting or extending App2's expiration timer, 950. The application server 170 also notifies App2 that its registration has been renewed by sending a service available message, 955, and App2 ACKs the service available message, 960. App2 resets or restarts the App2 TTL timer at 965, such that App2 will send a SIP REGISTER message for renewing App2's registration with the application server 170 the next time the App2 TTL timer expires, and so on.

While FIG. 9 illustrates two independent service available messages being transmitted from the application server 170 to App1 and App2 on the client device 400A at 920 and 955, in an alternative embodiment, one service available message can be piggybacked on the other so that only a single service available message transmission needs to occur to convey to both App1 and App2 that their respective registrations have been renewed. For example, the messaging of 920 and 925 can be moved after the decision logic of 935-950, 955 can be omitted, and the service available message that is sent to App1 can be configured to indicate, to App1, that App2's registration has also been renewed (e.g., by including an identification of App2 in addition to App1 in the service available message). App1 can then notify App2 using the application-to-application communicative information. In this scenario, additional security and authentication protocols may be implemented for App2 to accept App1's indication of registration renewal (e.g., because App1 may be less trusted by App2 than the application server 170 itself). In yet another alternative embodiment, the ACKs transmitted at 925 and 960 can instead be consolidated or piggybacked. For example, if App1 notifies App2 of App2's registration renewal based on a piggybacked service available message, and App1 is able to verify that App2 accepts the registration renewal notification for App2, App1's ACK can function to ACK the service available message notifications for both App1 and App2 (e.g., because the application server 170 can be configured to interpret App1's ACK as an implicit ACK for App2, similar to the SIP REGISTER message at 905).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a server configured to support a plurality of client applications that are configured for execution on a client device, comprising:
    registering each of the plurality of client applications with the server;
    receiving a given registration request message from the client device that includes a request for renewing a registration for a first of the plurality of client applications with the server;
    renewing the first client application's registration in response to the given registration request message;
    determining, in response to the given registration request message, whether to preemptively renew registrations for one or more other client applications from the plurality of client applications; and
    selectively renewing the registrations for the one or more other client applications based on the determination.

2. The method of claim 1, wherein the determining includes:
    determining to preemptively renew the registrations for the one or more other client applications based upon one or more of:
    (i) whether the one or more other client applications currently have active registrations with the server,
    (ii) whether the one or more other client applications are configured to permit preemptive registration renewals based on a registration request originating from a different client application on the client device,
    (iii) whether the one or more other client applications have interacted with the server within a first threshold period of time, and/or
    (iv) whether the active registrations for the one or more other client applications are scheduled to expire within a second threshold period of time.

3. The method of claim 1, further comprising:
    maintaining an application table at the server that maintains a list of client applications from the plurality of client applications that have active registrations with the server.

4. The method of claim 3, wherein each listed client application is stored in the list of client applications in association with (i) an application identifier, and (ii) a device identifier that identifies the client device.

5. The method of claim 3, wherein the determination is based upon the application table.

6. The method of claim 5, wherein the determination includes:
    determining to preemptively renew the registration of any client application other than the first client application in the list of client applications.

7. The method of claim 5, wherein the determination includes:
    determining to preemptively renew the registration of any client application other than the first client application that is (i) included in the list of client applications and (ii) is configured to permit preemptive registration renewals based on a registration request originating from a different client application on the client device.

8. The method of claim 5, wherein the determination includes:
    determining to preemptively renew the registration of any client application other than the first client application that is (i) included in the list of client applications and (ii) has interacted with the server within a threshold period of time.

9. The method of claim 5, wherein the determination includes:
    determining to preemptively renew the registration of any client application other than the first client application that is (i) included in the list of client applications and (ii) is scheduled to expire within a threshold period of time.

10. The method of claim 1, wherein the selectively renewing step renews registration for a second client application based on the determination, further comprising:
    transmitting a first notification to the first client application on the client device that indicates that the first client application's registration has been renewed; and
    transmitting a second notification to the second client application on the client device that indicates that the second client application's registration has been renewed.

11. The method of claim 1, wherein the determining determines to preemptively renew at least one registration for at least one client application from the one or more other client applications that is not yet expired.

12. The method of claim 1, wherein each of the plurality of client applications includes a user interface (UI) and a high-level operating system (HLOS) interface for interfacing with an HLOS that is configured for execution on the client device.

13. A server configured to support a plurality of client applications that are configured for execution on a client device, comprising:
    means for registering each of the plurality of client applications with the server;
    means for receiving a given registration request message from the client device that includes a request for renewing a registration for a first of the plurality of client applications with the server;
    means for renewing the first client application's registration in response to the given registration request message;
    means for determining, in response to the given registration request message, whether to preemptively renew registrations for one or more other client applications from the plurality of client applications; and
    means for selectively renewing the registrations for the one or more other client applications based on the determination.

14. A server configured to support a plurality of client applications that are configured for execution on a client device, comprising:
    logic configured to register each of the plurality of client applications with the server;
    logic configured to receive a given registration request message from the client device that includes a request for renewing a registration for a first of the plurality of client applications with the server;
    logic configured to renew the first client application's registration in response to the given registration request message;
    logic configured to determine, in response to the given registration request message, whether to preemptively renew registrations for one or more other client applications from the plurality of client applications; and
    logic configured to selectively renew the registrations for the one or more other client applications based on the determination.

15. A non-transitory computer-readable medium containing instructions stored thereon, which, when executed by a server configured to support a plurality of client applications that are configured for execution on a client device, cause the server to perform operations, the instructions comprising:
    at least one instruction for causing the server to register each of the plurality of client applications with the server;
    at least one instruction for causing the server to receive a given registration request message from the client device that includes a request for renewing a registration for a first of the plurality of client applications with the server;
    at least one instruction for causing the server to renew the first client application's registration in response to the given registration request message;
    at least one instruction for causing the server to determine, in response to the given registration request message, whether to preemptively renew registrations for one or more other client applications from the plurality of client applications; and
    at least one instruction for causing the server to selectively renew the registrations for the one or more other client applications based on the determination.

* * * * *